United States Patent [19]

Bagard

[11] Patent Number: 5,711,062
[45] Date of Patent: Jan. 27, 1998

[54] PROCESS FOR MANUFACTURE OF A FLUID CONTAINMENT ELEMENT

[75] Inventor: Jean-Paul Bagard, Chatenoy Le Royal, France

[73] Assignee: SEVA, Chalon Sur Saone, France

[21] Appl. No.: 391,446

[22] Filed: Feb. 21, 1995

[30] Foreign Application Priority Data

Feb. 22, 1994 [FR] France .................... 94 02149

[51] Int. Cl.$^6$ .............. B23P 17/04; B23P 25/00; B21B 45/00
[52] U.S. Cl. .......... 29/527.2; 29/422; 29/469.5; 29/DIG. 36; 29/DIG. 37; 72/42; 72/46; 72/53
[58] Field of Search .................. 29/527.2, 527.5, 29/527.7, 890.01, 422, 469.5, DIG. 47, DIG. 36, DIG. 37; 72/46, 41, 42, 53, 397.4; 427/135; 148/675, 692

[56] References Cited

U.S. PATENT DOCUMENTS

| | | |
|---|---|---|
| 2,801,604 | 8/1957 | Russell et al. .................... 29/527.2 |
| 3,154,849 | 11/1964 | Dolch, Jr. ............................ 72/46 |
| 3,657,804 | 4/1972 | Krock et al. .................. 29/DIG. 47 |
| 4,281,528 | 8/1981 | Spiegelberg et al. ............... 72/46 |
| 4,366,077 | 12/1982 | Andrew et al. .................. 72/46 X |
| 5,072,605 | 12/1991 | Imazu et al. ....................... 72/46 |
| 5,233,755 | 8/1993 | Vandendrierssche ......... 29/890.01 |

*Primary Examiner*—Peter Vo
*Attorney, Agent, or Firm*—Sughrue, Mion, Zinn, Macpeak & Seas, PLLC

[57] ABSTRACT

Process for the manufacture of a containment element for a fluid heated to a temperature exceeding 850° C. A blank made of a refractory metal alloy is coated with a glass-based adhesive, at least one film made of a glass suitable for the material and the plasticity temperature of the blank is laid down on it, the blank is heated to the plastic temperature and subjected to a first stamping operation to shape the chamber of the containment element, followed by a second stamping operation to form the inner or outer flaps of the chamber. The element is then cooled, and finally, heat-treated.

16 Claims, No Drawings

PROCESS FOR MANUFACTURE OF A FLUID CONTAINMENT ELEMENT

BACKGROUND OF THE INVENTION

This invention concerns the manufacture of a containment element, particularly to a process for manufacturing a containment element or cauldron designed to hold, and to allow the flow of, a fluid heated to high temperature, for example in compressors, turbocompressors, and centrifuges intended for the manufacture of mineral fibers, such as glass or rock wool, or aeronautical or aerospace turbines (see the articles "Laser Drilling Holes at an Angle," in the Journal Metalworking Production, column entitled "Technology Showcase," September 1993).

Superalloys (see FR-A-2 534 167) are especially advantageous in the manufacture of metal parts which must withstand wear and corrosion caused by the flow of a fluid at high temperature. Superalloys are alloys strengthened by the precipitation of carbide or similar particles; they are mainly nickel-, cobalt-, iron-, or iron-nickel-based.

In accordance with conventional technology, the parts are molded to the desired shape, since the shaping of articles made of these alloys is extremely complex. In fact, because superalloys cannot be bent when cold, they must be worked continuously at their plastic temperature.

Because of the temperatures involved, elastomer materials cannot be used to form elements. Moreover, shaping techniques carried out under gas pressure raises the problem of equipment complexity. In addition, the problems of localized heating resulting from the stamp/element/mold interface and from the deformation of the element must be avoided.

Furthermore, after shaping the parts and effecting any desired treatment, the structure and size of the metal grains must be such that the element possesses the desired mechanical properties.

SUMMARY OF THE INVENTION

This invention is intended to solve these problems, and, to that end, the process according to the invention consists of the following steps:

a) coating a blank made of a heat-resistant metal alloy with an adhesive containing a mineral substance, such as glass, b) depositing on the blank at least one film made of a mineral substance, e.g., glass, suitable for the material and the plasticity temperature of the metal alloy of the blank, c) heating the blank to the plasticity temperature, d) performing a first blank-forming operation by stamping the chamber of the containment element, e) performing a second operation for forming of the inner or outer flaps by stamping the end part of the chamber, f) cooling the element, and g) heat treating it.

In this process, the element undergoes finishing either by contraction or by thickening. Following heat treatment, it exhibits good austeniticity or effective recrystallization which can be duplicated in mass-produced elements.

According to other characteristics:

1) the blank is made of an alloy strengthened by oxide dispersion;

2) the blank is made of a metal produced using powder metallurgy, by powder spraying followed by forging;

3) the blank is produced by melting the alloy, then refining, especially in a vacuum, followed by a rolling operation;

4) the blank is shot-blasted prior to coating, and/or the glass film-deposition step is followed by a baking operation; and/or 5) the glass-based adhesive comprises at least one glass, one ceramic, a binding agent, and water.

The first forming operation is followed by the following steps:

i) cooling, ii) machining the periphery of the element obtained by forming the blank, in order to produce an even end, and iii) heating the part to the plastic temperature.

After cooling, following the second forming operation:

iv) a third forming operation may be performed to increase the angle of the flap, followed by v) cooling, followed by vi) shot-blasting, and then heat treatment.

The step involving the heating of the blank is carried out in an oven, which is preheated to allow thermoforming when the blank is removed therefrom.

DETAILED DESCRIPTION OF THE PREFERRED EMBODIMENT

In one embodiment of the invention as applied to the manufacture of an aeronautical turbine chamber or of a centrifuge used to manufacture glass wool, the initial blank is a disk which, in a first step, is formed by plasma-arc cutting from a sheet of an alloy reinforced by oxide dispersion and incorporating a nickel-based superalloy matrix containing an aluminum alloy. The thickness of the initial blank is between 9 and 9.8 nm.

To determine the diameter of the initial blank, it is presumed that, overall, the thickness remains constant during the forming operation. Thus, the area of the initial blank is equal to the total area of the finished part. The dimensions are taken at the neutral axis of the element.

The blank is sanded, then coated using a liquid adhesive comprising a glass, a ceramic, a binding agent, and water containing (in gravimetric proportions):

| | |
|---|---|
| non-lead flux stone | 40 to 76% |
| basic oxide | 35 to 45% |
| amphoteric oxide | 2 to 13% |
| mineral | 1 to 7% |
| liquid | 0 to 15% |
| binding agent | 3 to 15%. |

Next, one or multiple layers of a component existing as a mat, a woven glass fabric, or a ceramic cloth are deposited to form an insulating, self-annealing glass material which covers the entire surface area of the blank. This covering is suitable for and compatible with the material making up the blank, and thickens at the forming temperature thereof. Next, the covered blank is baked at 80° C. for fifteen minutes, then stored. The blank is thereafter heated to its plastic temperature in an ambient atmosphere. The thermoforming stamp is preheated to 400° C., the blank is removed from the oven and placed beneath the apparatus, and the first forming operation is effected by lowering the stamp to the center of the blank, thereby shaping the cavity defining and delimiting the chamber. The stamped element is cooled, then machined to smooth out any creases on its outer circumference.

The element is heated once again to its plastic temperature, followed by shaping the open end of the element on the outside in order to produce the flap. The element is cooled, then shot-blasted. Finally, a relaxation heat treatment releases the inner stresses of the element and recrystallizes the metal.

This invention makes it possible to shape metal alloys not produced using foundry methods, in order to meet particularly harsh criteria of use.

I claim:

1. A process for manufacturing a containment element designed to hold and allow the flow of a fluid heated to a temperature greater than 850° C., comprising the steps of:
   a) providing a blank made of a heat-resistant metal alloy;
   b) coating the blank with an adhesive containing a mineral material,
   c) depositing on the blank at least one film made of a mineral material suitable for the material and the plastic temperature of the blank,
   d) heating the blank to the plastic temperature of the heat resistant metal alloy, which plastic temperature is above 850° C.,
   e) performing a first stamping operation on the heated blank to form a chamber of the element,
   f) performing a second stamping on an end of the chamber to produce flaps,
   g) cooling the element, and
   h) heat treating the element, the element being suitable for holding and allowing the flow of a fluid heated to a temperature greater than 850° C.

2. The process according to claim 1, wherein the blank is made of an alloy strengthened by oxide dispersion.

3. The process according to claim 1, wherein the blank is made of a metal produced by powder metallurgy, by powder spraying followed by forging.

4. The process according to claim 1, wherein the blank is made by melting the alloy, then refining, followed by a rolling operation.

5. The process according to claim 4, wherein the refining is performed in a vacuum.

6. The process according to claim 1, wherein the blank is shot-blasted prior to coating, and the film deposition is followed by a baking step.

7. The process according to claim 1, wherein the adhesive contains at least one glass, one ceramic, a binding agent, and water.

8. The process according to claim 1, wherein the first stamping operation is followed by the steps of:
   i) cooling, and
   ii) machining the periphery of the part produced by shaping the blank, in order to obtain an even end, and following step g:
   iii) heating the element to said plastic temperature,
   iv) performing a third forming operation to increase the flap angle,
   v) cooling, and
   vi) shot-blasting, followed by the heat treatment of step h).

9. A process according to claim 1, wherein the blank-heating operation of step d) is effected in an oven and is followed by the preheating of a thermoforming apparatus, the removal of the blank from the oven, and shot-blasting.

10. The process according to claim 1, wherein the adhesive contains a mineral material comprising glass.

11. The process according to claim 1, wherein the deposited film contains a mineral material comprising glass.

12. The process according to claim 1, wherein the second stamping operation is performed on an end of the chamber to produce inner flaps.

13. The process according to claim 1, wherein the second stamping operation is performed on an end of the chamber to produce outer flaps.

14. The process according to claim 1, wherein step e) comprises preheating a thermoforming apparatus to 400° C. and performing the first stamping operation on the blank using the preheated thermoforming apparatus to form the chamber of the element.

15. The process according to claim 1, wherein the blank comprises a nickel-based superalloy matrix.

16. The process according to claim 15, wherein the nickel-based superalloy matrix contains an aluminum alloy.

* * * * *